Figure 1:
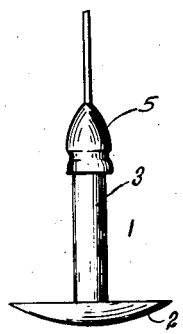

Dec. 20, 1927.

A. H. FISHER 1,653,499

TIRE REPAIR DEVICE AND METHOD

Filed July 25, 1927

INVENTOR.
Albert H. Fisher.
BY
Fay, Oberlin & Fay
ATTORNEYS.

Patented Dec. 20, 1927.

1,653,499

UNITED STATES PATENT OFFICE.

ALBERT H. FISHER, OF EAST CLEVELAND, OHIO, ASSIGNOR TO KEX COMPANY, INCORPORATED, OF ST. LOUIS, MISSOURI, A CORPORATION OF MISSOURI.

TIRE-REPAIR DEVICE AND METHOD.

Application filed July 25, 1927. Serial No. 208,151.

This invention as indicated relates to a tire repair device and method. More particularly it comprises a tire repair apparatus including a headed tire repair plug with means secured to the resilient stem portion thereof to facilitate the insertion of said stem within a puncture hole. It also includes a method of rapidly and effectively sealing a puncture aperture in a tire casing from the ingress of dirt and particles of grit and sand and the like, which would cause injury to the inner tube of a tire casing, as well as to prevent the entrance of moisture to the fabric layers of a casing deteriorating and lessening the life of the same.

The method contemplates the insertion of the permanently attached terminal secured to the free end of the plug stem, through a puncture hole and thereafter elongating and narrowing the body portion of the plug stem so that it may freely pass through a puncture hole of narrower dimension than the normal transverse dimension of said plug stem, until the inner face of the head of the plug is drawn into firm contact with the inner wall of the tire casing, and thereafter releasing the tension upon said resilient portion of the plug stem so that it may be enlarged to completely seal the puncture hole.

Heretofore it has been the practice in using mushroom-shaped plugs to repair holes in tire casings and the like to insert the stem of said plug within a socket formed in the base of a needle or inserting tool and to press the same from inside the casing through the puncture aperture until the head of the plug was brought into contact with the inner wall of the tire casing and the inserting implement was removed by drawing it through on the outer side of such casing, the stem then being cut off adjacent the outer surface of the tire. The use of an independent inserting tool involves the matter of adjusting the same to the size of the plug stem used and requires that care be used in not injuring the tool or having it unavailable when it is later required for use with other plugs.

The present invention provides for the permanent mounting upon the free end portion of the plug stem of an inserting implement in the form of a terminal cap preferably made of thin metal or other suitable material which cap preferably terminates in a conical point which is provided in its extreme end with an aperture through which a headed wire is inserted, said wire serving as a means for drawing said cap and the associated plug stem through the aperture to be closed. To the accomplishment of the foregoing and related ends, said invention, then, consists of the method hereinafter fully described and particularly pointed out in the claims.

The annexed drawing and the following description set forth in detail certain means and one mode of carrying out the invention, such disclosed means and mode illustrating, however, but one of various ways in which the principle of the invention may be used.

Figure 2:
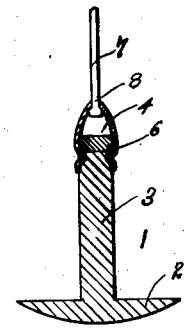
Figure 5:
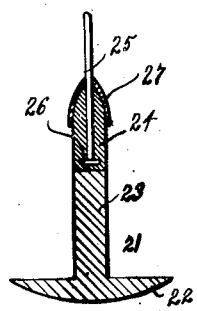
Figure 3:
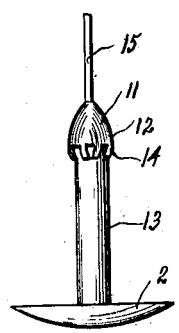
Figure 4:
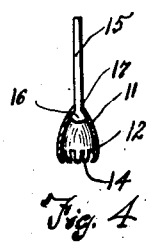

In said annexed drawing:

Fig. 1 is a front elevation showing one form of construction involving the principle of my invention; Fig. 2 is a central vertical sectional view of the construction shown in Fig. 1; Fig. 3 is a front elevation showing a modified form of construction; Fig. 4 is a perspective view illustrating the conical metal tip shown in Fig. 3 prior to its attachment to the free end of the stem of the plug; and Fig. 5 is a central vertical sectional view of a still further modified construction.

As is clearly shown in Figs. 1 and 2, in the form of construction used for purposes of illustration of my invention, there is provided a plug 1 having a head portion 2 and a stem portion 3, the plug being of the type usually known as a mushroom-shaped plug. The head may be of elastic deformable material or may be of a rigid or semi-rigid construction, and the material may differ from that of the plug stem. The plug stem is formed in whole or in part of elastic deformable material in order that said stem may be elongated when the device is to be inserted through the puncture hole of a tire casing or through a similar aperture in other articles of manufacture. The free end of the stem has attached thereto an inserting implement or terminal member preferably in the form of a metal cap as has been mentioned. This metal cap, or like structure, if attached to the extreme end of an elastic soft rubber stem by crimping or like means, in many instances, will not obtain a secure enough engagement with the stem to prevent the elongation of the stem and the reduction of the size of the tip to a point where it will escape from the open lower end of the cap member.

In order to avoid this action I find it desirable to provide a binding or securing element adjacent the free end of the stem portion. This may be accomplished in various ways, that illustrated in Fig. 1 involving the provision of an area 4 of hardened or semi-hardened rubber formed integrally with the softer portion of the stem and affording a means for securely anchoring and attaching the cap member to the end of the resilient stem. Instead of forming a hard rubber tip at the end of the resilient stem there may be inserted within the end of the stem some hard substance such as a metal globule of spherical or other appropriate shape which will act in much the same manner as a tip portion formed of hard or semi-hard rubber, in preventing disengagement of said cap member from said stem when subjected to tension. As has been indicated, the purpose of modifying the free end portion of the stem is to provide a securing base for an attaching and an inserting member. The securing base may be of hardened or semi-hardened rubber, or may be formed in any suitable manner so long as it provides at the tip of the stem, a portion of less resiliency than the soft rubber portion of the stem, and yet of sufficient resiliency to serve as an anchorage for the inserting member. The inserting member may be applied over this modified tip portion of the stem as shown in Figs. 1, 2 and 3, or engaged within the modified tip portion of the stem as shown in Fig. 5. Various methods of attachment may be used, but the securing base is preferable within the cap member at a point above or adjacent the clamping portion thereof.

After providing such changes at the tip of the resilient plug stem, it is necessary to attach the cap member thereto. This may be accomplished in a number of different ways. In the form illustrated in Fig. 1, the cap member 5 comprising a tapered sleeve of thin metal which may be engaged over the hardened or semi-hardened end of the elastic stem and held in position by having an internal rib 6 spun into the base portion of said cap beneath the hardened or semi-hardened section of the stem. Before applying the cap, a headed wire 7 is inserted through the aperture 8 in the tip of the cap to serve as a means for engaging the cap and its associated stem through the puncture hole of a tire casing or the like.

When a thin metal cap 11 of the character illustrated in Figs. 3 and 4 is to be applied, the sleeve portion 12 is engaged over the hardened end of the plug stem 13 and the prongs 14 formed around the lower margin of the cap are pressed inwardly. In some instances where heavy tension is not to be applied to the inserting terminal, the cap may be applied to the soft end of the stem and closely crimped thereto. Only a very moderate degree of tension may be used in such case, however. In order to facilitate the introduction of the stem through the puncture aperture, the cap member is provided preferably with a wire 15 attached to the head portion by being formed with a head 16 of a size larger than the size of the aperture 17 in the end of the cap.

In making a repair, said wire is engaged through the puncture hole from within the tire casing and is engaged exteriorly of said puncture hole by means of a gripping implement such as a pair of pliers. It is obvious, however, that other means of introducing the cap may be employed, for instance, the cap may have an elongated tapered point which may be projected through the puncture hole and said point engaged by a pliers or other gripping implement to draw the same through said aperture.

After the cap is drawn through said puncture hole, the pull on the outer end of the device is continued until the plug stem is drawn through the puncture aperture to a point where the inner face of the head of the plug bears against the inner wall of the tire casing. During this process of drawing the plug stem through the puncture aperture, the stem is elongated and reduced in transverse dimension so that it passes freely through an aperture of much larger size than that of the normal diameter of the plug stem. When the tension on the end of the plug stem is released, the elasticity in the body portion of the plug stem tends to restore the plug stem to its normal diameter. Its return to normal size, however, is limited by the pressure of the walls of the puncture hole with which the outer surface of the resilient portion of the plug stem interengages in interlocking self-conforming relation. After the plug is seated in the puncture hole in the manner just described, the projecting end of the plug stem is severed at a point adjacent the outer surface of the tire casing and the remaining portion of the plug stem and the inserting attachment is discarded.

The form of construction illustrated in Fig. 5 dispenses with the use of a separate cap member and utilizes the hardened rubber end of the plug stem to engage the inserting member. In the form shown, the plug 21 having head 22 and stem 23 of elastic material such as soft rubber is provided at its upper end with a section made of hard or semi-hard rubber 24 of sufficient tenacity and rigidity to firmly engage the head 26 of an inserting wire 25 which serves to seat the same within a puncture aperture. The end section preferably is tapered. It is obvious that various forms of this construction may be produced, including a stem with apertures or channels formed in the hard rubber tip adapted to be temporarily or permanently engaged by means of an inserting instrumentality such as a wire, elongated cap, or other form of inserting terminal. A tapered cap or shield 27 may be provided above the top face of the hardened or semi-hardened end of the stem to facilitate its passage through the puncture aperture.

In addition to the apparatus just described, the invention as indicated has in view a new and improved method of tire casing repair inasmuch as a single instrumentality is provided which may be inserted through a puncture aperture with greater speed and more effective puncture sealing capacity than devices of the character heretofore generally used. The method involves the drawing through of the free end portion of the device preliminary to the elongation of the body portion of the plug stem to a size much smaller than its normal diameter and thereafter releasing said plug stem to completely fill the puncture aperture through its tendency to return to its original transverse dimensions.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:

1. A device of the character described having in combination a headed plug provided with a stem having a resilient body portion, and a less resilient end portion and a metal inserting implement permanently secured to said end portion.

2. A device of the character described having in combination a headed plug provided with a stem having a resilient body portion and a free end portion provided with a less resilient cap-engaging area adjacent said end and an inserting implement in the form of a cap of rigid material permanently engaged with said free end of said stem.

3. A device of the character described having in combination a headed plug provided with a stem having a resilient body portion and a free end portion provided with a less resilient cap-engaging area adjacent said end, an inserting implement in the form of a cap of rigid material engaged with said free end of said stem, and means provided in said cap for preventing the removal of the same from said stem.

4. A device of the character described having in combination a headed plug provided with a stem having a resilient body portion and a free end portion provided with a less resilient cap-engaging area adjacent said end, an inserting implement in the form of a cap of rigid material engaged with said free end of said stem, and an internal rib provided in said cap for preventing the removal of the same from said stem.

5. A device of the character described having in combination a headed plug provided with a stem having a resilient body portion and a free end portion provided with a less resilient cap-engaging area adjacent said end, an inserting implement in the form of a cap of rigid material engaged with said free end of said stem, an internal rib provided in said cap at a point below said end portion of said stem for retaining said cap in position upon said stem.

6. A device of the character described comprising a repair plug having a head, and a stem of elastic deformable material having a body portion of suitable length to engage as a sealing element within the puncture hole of a tire casing and a modified free end of more resistant material than the remaining portion of said stem to facilitate its insertion through the puncture hole and permit elongating the remaining portion of said stem by means of force applied to said modified portion of said stem to cause said remaining portion to be narrowed in transverse dimension to more readily pass through the puncture hole.

7. A tire repair plug having a head and a stem section, said stem having a section adjacent the base thereof of elastic deformable material and a substantially rigid nonelastic section adjacent the free end thereof for elongating the first-named section and inserting the same in a puncture hole.

8. A device of the character described having in combination a headed plug provided with a stem having a resilient body portion and an end portion of less resiliency adapted to form a securing base for an inserting member.

9. A device of the character described having in combination a headed plug provided with a stem having a resilient body portion and an end portion of less resiliency adapted to form a securing base for a permanently attached inserting member.

10. A device of the character described having in combination a headed plug provided with a stem having a resilient body portion and an end portion of less resiliency adapted to form a securing base for an inserting member, and an inserting member engaged over said end portion, and means for permanently securing the same thereto.

11. A device of the character described having in combination a headed plug provided with a stem having a resilient body portion and an end portion of less resiliency adapted to form a securing base for an inserting member, an inserting member engaged over said end portion, and a constricted opening formed adjacent the base of said inserting member and below said less resilient area of the stem for preventing the removal thereof from the end of the plug stem.

Signed by me this 18th day of July, 1927.

ALBERT H. FISHER.